G. T. HACKLEY.
TIRE SIGNAL.
APPLICATION FILED DEC. 14, 1910. RENEWED APR. 11, 1912.
1,044,779.
Patented Nov. 19, 1912.
2 SHEETS—SHEET 1.
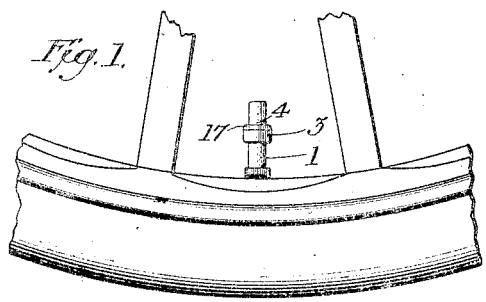
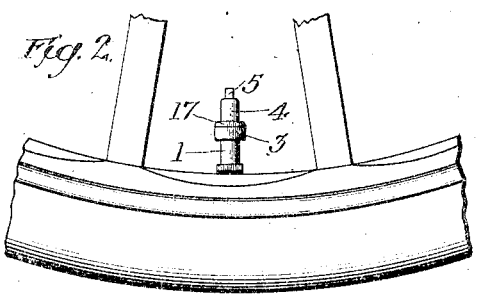
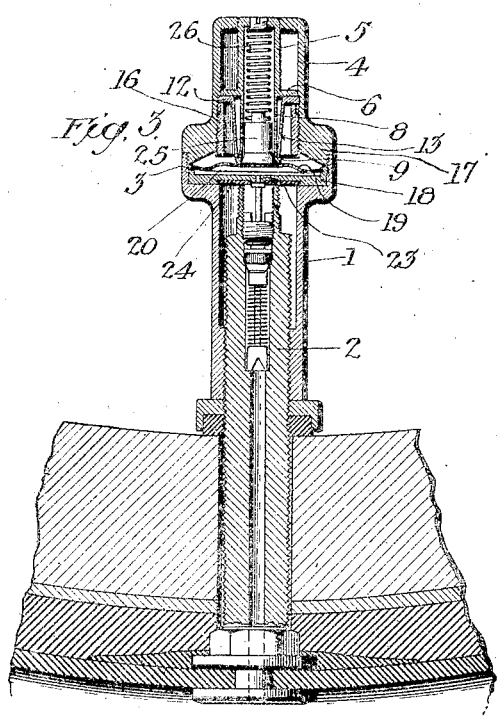
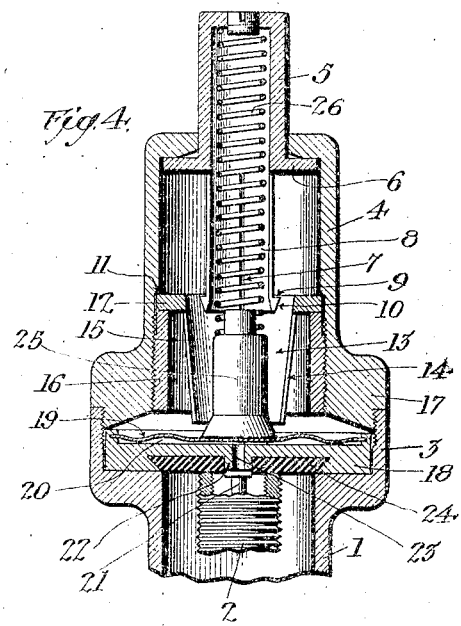
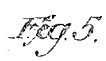
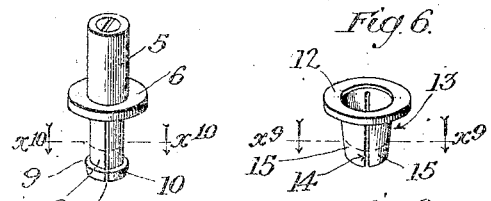
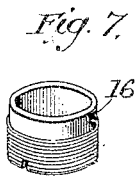
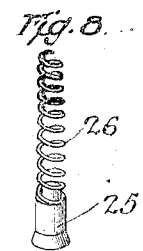
Witnesses:
Inventor
George T. Hackley.

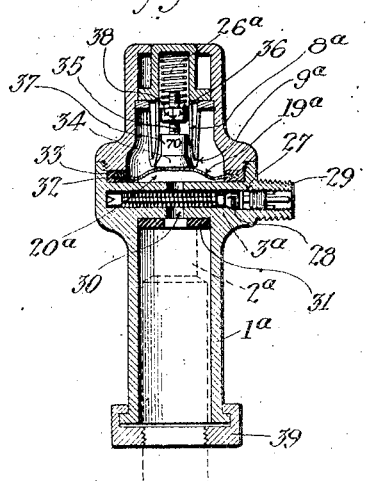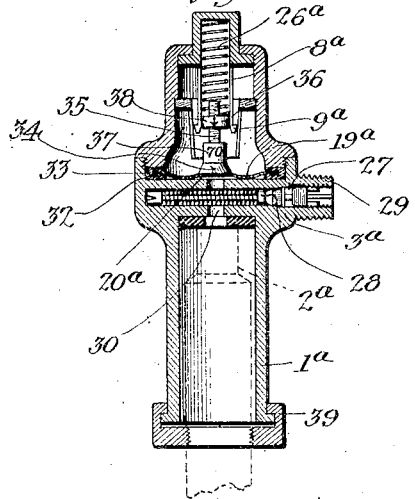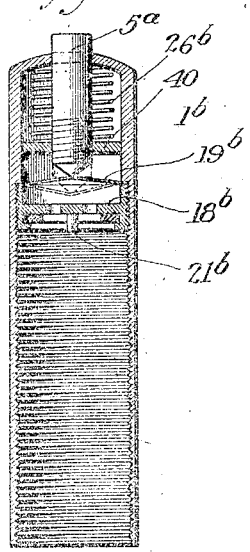

UNITED STATES PATENT OFFICE.

GEORGE T. HACKLEY, OF LOS ANGELES, CALIFORNIA.

TIRE-SIGNAL.

1,044,779.

Specification of Letters Patent.  Patented Nov. 19, 1912.

Application filed December 14, 1910, Serial No. 597,862. Renewed April 11, 1912. Serial No. 690,181.

*To all whom it may concern:*

Be it known that I, GEORGE T. HACKLEY, a citizen of the United States, residing at Los Angeles, in the county of Los Angeles and State of California, have invented a new and useful Tire-Signal, of which the following is a specification.

This invention relates to a device which is adapted to be secured to a pneumatic tire and to provide a signal which, when in one position, indicates that there is sufficient pressure in the tire, and when in another position will indicate that the pressure in the tire has fallen below a definite point, the purpose of the device being to enable the condition of the pressure to be told at a glance without requiring careful scrutiny to read a scale.

Pressure gages, or the like, which have heretofore been employed, require a careful scrutiny of the scale in order to determine the pressure, but for nearly all practical purposes the operator of an automobile, as a rule, is particularly concerned only with knowing whether the pressure in the tire is enough to run without injury to the tire; he does not ordinarily care to know what that exact pressure is in pounds or fractions thereof, and it is the object of the present invention to provide a signal having two positions so that, for example, the signal will remain stationary in one position so long as the pressure remains above seventy pounds; but when the pressure falls below seventy pounds the signal is automatically moved to another position, whereby the operator of the automobile may see at a glance that the pressure is below the safe point. The signal will remain in this position until the tire has been inflated to raise the pressure to seventy pounds or more.

A distinguishing and novel feature which enables the condition of the tire to be immediately ascertained without close scrutiny, is that the signal does not move gradually from one extreme position to another, but has only two positions which are markedly different from each other, and the signal when operated automatically moves suddenly from one position to the other so that it is always in the one position or the other and occupies no intermediate position which would necessitate a careful scrutiny or measurement.

This device is designed to operate at relatively high pressures in the tire, that is, at or near the pressure normally carried in the tire. A drop of ten pounds from the normal pressure can not be detected by noting the appearance of the tire, yet the signal will be operated to warn the user that the pressure has fallen as low as it should be permitted to fall.

The device is directly responsive to the pressure within the tire and is not operated by the distortion or flattening of the tire.

In the preferred form, the signal is in the form of a button, and thus in the dark, by merely placing the finger over the end of the device, its position may instantly be felt whether it is flush with the barrel or protrudes from the barrel.

Briefly, the invention comprises in its preferred form an air chamber which is placed in communication with the interior of the tire, there being a diaphragm arranged on one side of the air chamber, and a slidable button having two positions, with mechanism operated by the diaphragm when extended by air pressure to detachably lock the button in one position, the said mechanism acting automatically to release the button when the diaphragm recedes from the extended position upon a reduction of pressure in the tire. The button thereupon being projected into its other position indicates that the pressure has reduced below the desired point at which the device is designed to act. The resistance of the diaphragm to the pressure of air in the tire is afforded by a spring, the pressure of which against the diaphragm will determine the point at which the diaphragm will recede and will thereby determine the pressure at which the button will be released and projected.

One of the devices is intended to be carried on the valve stem of each tire, taking the place of the ordinary dust cap. In one form, in order to inflate the tire, the device must be unscrewed from the valve stem; while in another form the device is so constructed that the tire may be inflated without removing the device from the valve stem.

It is not essential whether the outer position of the button indicates sufficient pressure and the inner position of the button insufficient pressure, or vice versa. In practice, however, I prefer to have the inner or flush position of the button designate sufficient pressure and the extended position of the button designate insufficient pressure.

Referring to the drawings:—Figure 1 is a side elevation of a portion of a rim and tire equipped with the device, the device indicating that sufficient pressure is in the tire. Fig. 2 is a view similar to Fig. 1, the device indicating that there is insufficient pressure. Fig. 3 is an enlarged, sectional view through the device as applied to the valve stem, showing part of the rim and part of the tire in section. In this view the signal is in flush position indicating sufficient pressure. Fig. 4 is a view enlarged greater than Fig. 3, showing the upper portion only in longitudinal section, and showing the button in extended position with the other parts in a corresponding position. Fig. 5 is a perspective view in detail of the button. Fig. 6 is a perspective view in detail of the button holder. Fig. 7 is a perspective view in detail of the retaining sleeve. Fig. 8 is a perspective view in detail of a cone and coil spring which depresses the same. Fig. 9 is a section on line $x^9$—$x^9$ Fig. 6. Fig. 10 is a section on line $x^{10}$—$x^{10}$ Fig. 5. Fig. 11 is a vertical, longitudinal view through another form, showing the button in flush position. Fig. 12 is a view similar to Fig. 11, showing the button in extended position. Fig. 13 is a sectional view, showing another form wherein extended position of the button indicates sufficient pressure and flush position indicates insufficient pressure.

Referring to the form shown in Figs. 1 to 10 inclusive, the device comprises a barrel 1 internally threaded at its lower end and adapted to be screwed on the valve stem 2. The upper end of the barrel 1 is enlarged and formed with an internally threaded flange 3, and screwed therein is the flanged lower end of a cap 4. The upper end of the cap 4 is perforated and slidable therein is a hollow button 5, the lower end of which is formed with a flange 6 which slides in the upper part of the cap 4 and acts to guide the button. Below the flange 6 the tubular portion is provided with several slits 7 and the metal is hardened and tempered to form spring fingers 8. Formed on the lower ends of the spring fingers are shoulders 9 with sloping sides 10. The cap 4 is formed with a shoulder 11 which serves as a seat for the flange 12 of a button holder comprising a frusto-conical shell 13, shown in detail in Fig. 6, which is provided with slits 14 to form several spring fingers 15. The button holder is held against the shoulder 11 by a threaded sleeve 16 which is screwed into the cap 4. The lower part of the cap 4 is provided with an externally threaded flange 17 which is screwed into the flange 3. Within the flange 3 is a diaphragm holder comprising a flanged disk 18, in the upper part of which is secured a diaphragm 19 preferably of thin spring metal, the edges of the diaphragm being secured to the diaphragm holder with an air-tight joint, thereby forming an air chamber 20 of variable size between the diaphragm and diaphragm holder. 21 designates the plunger stem of the valve which is depressed by a projection 22 on the diaphragm holder and the diaphragm holder is provided with a central orifice 23 which extends through the projection 22, so that when the instrument is applied, as shown in Fig. 3, air from within the tire is permitted to enter through the perforation 23 into the air chamber 20 below the diaphragm 19. It should be understood that the end of the pin 21 makes a poor contact with the lower end of the projection 22 and thus does not prevent the passage of air into the perforation 23. A rubber gasket 24 is seated in the lower portion of the diaphragm holder 18 and bears against the upper rim of the valve stem 2 and prevents leakage of air. Above the diaphragm 19 is a cone 25 and the latter is yieldingly held against the diaphragm by a compression spring 26 located within the button 5. The compressed air from within the tire, which enters the air chamber 20, distends the diaphragm 19 and pushes up the cone 25 until the diaphragm is fully distended or it strikes the lower rim of the button holder 13; the latter may act as a positive stop to prevent the diaphragm from further movement. If the button 5 be then depressed, the lower edges of the spring fingers 8 will be forced between the cone 25 and spring fingers 15 and as the cone 25 can not yield downwardly, being supported by the diaphragm, the spring fingers 15 are sprung outwardly, permitting the shoulder 9 of the spring fingers 8 to engage the lower edges of the spring fingers 15, whereupon the button is locked from upward movement, the parts then being in the position shown in Fig. 3, and when the button is in this position with its upper end flush with the cap 4, it indicates that there is a sufficient air pressure in the tire. When the pressure in the tire reduces, the spring 26 will force the cone 25 gradually downward, causing the diaphragm 20 to retract at a rate proportioned to the gradual reduction of pressure in the tire and as the cone 25 thus lowers, it gradually permits the spring fingers 8 to retract to move inwardly and radially and when the cone 25 has descended far enough, the shoulder 9 of the spring fingers will disengage the lower edge of spring fingers 15, whereupon the spring 26 will thrust the button outwardly, so that it protrudes from the cap 4, the parts then taking the position shown in Fig. 4, and when the button is in this position it indicates that the pressure in the tire has fallen to the lowest safe pressure and that the tire should be inflated. In this form of the invention it is necessary to remove the device from the valve stem in order to inflate the tire.

Figs. 11 and 12 show another form in which the tire may be inflated without removing the device. In the latter form, the flange $3^a$ of the body $1^a$ is provided with a transverse bore 27 within which is arranged an automatic spring-operated valve 28 of well known construction, which is readily removable from the bore 27 and which permits air to be pumped in through the nipple 29 and prevents air from escaping outwardly therethrough. The flange $3^a$ is also provided with a longitudinal orifice 30 which intersects with the bore 27, thereby giving communication between the valve stem $2^a$ and the air chamber $20^a$ below the diaphragm and also giving communication from the bore 27 to the valve stem $2^a$. A gasket 31 is arranged in the upper end of the barrel $1^a$ and bears against the upper rim of the valve stem $2^a$ preventing leakage. In this form, the valve in the stem $2^a$ is entirely removed, so that no depresser device for holding the same open is required as in the previous form. In this form I have shown the edges of the diaphragm $19^a$ crimped and provided with a series of circumferential corrugations 32 which are indented in a gasket, preferably, a rubber ring 33, the latter being vulcanized onto the corrugated rim of the diaphragm, so that the parts are more firmly united than if the diaphragm were clamped between two separate gaskets. At the same time, the single rubber gasket 33 permits the slight spring of the edge of the diaphragm which it naturally takes when the diaphragm is moved from one position to the other. While virtually all of the movement of the diaphragm is confined to its center portion, I have found in practice that at the rim of the diaphragm there is an extremely slight spring when the diaphragm is operated which tends to loosen the joint between the diaphragm and gasket unless the union at this point is good. This method of elastically supporting the edge of the diaphragm obviates this. The gasket 33 is clamped between the rim $3^a$ and cap 4. In this form, the cone 34 is formed with a threaded stem 35 on which is a nut 36 and the spring $26^a$ presses against the nut 36. By adjusting the nut 36 on the threaded stem 35, the pressure of the spring $26^a$ may be varied to cause the signal to be operated at various degrees of pressure. The degree of pressure at which the signal will be released may be determined by numerals 37 on the cone 34 and an arrow 38 on the nut 36. Thus, for example, the cone 34 may be provided with a series of numbers, say 50—60—70—80—90—100, and, by turning the nut 36 to bring the arrow 38 over any of the said numbers, the tension of the spring $26^a$ will be adjusted accordingly to cause the button to be released when the pressure falls to the point indicated by the number of pounds per square inch corresponding to the number at which the signal is set. Thus, if the tire were to carry a pressure of seventy pounds per square inch, the arrow 38 would be adjusted in line with the numeral "70," as shown in Figs. 11 and 12, and when the pressure in the tire has fallen ten pounds less than seventy, the button would be released. The amount of decrease in pressure from the maximum to the minimum, for instance in the above example of ten pounds, is determined by the form of the cone 34 and the width of the shoulders $9^a$ at the lower ends of the spring fingers $8^a$, for, as the pressure in the tire gradually decreases, the diaphragm $19^a$ is gradually moved down by the spring $26^a$ and this downward movement continues until the shoulders $9^a$ are released. By making the shoulders $9^a$ wider and the cone 34 with a longer stroke, the reduction in pressure from maximum to minimum will be greater. For most purposes, however, a reduction in pressure of from ten to fifteen pounds is preferred, as it is not desired to inflate the tires above their regular point of inflation and it is desired that the pressure should fall below this point not more than ten or fifteen pounds before they should be reinflated to secure the best service from them. In inflating the tire in this form, it is not necessary to remove the device, as inflation is made through the nipple 29, the air passing downward into orifice 30 through valve stem $2^a$ and thence to the inner tube.

39 designates a union which is revoluble on the lower end of the barrel $1^a$ and forms means of attaching the device to the valve stem $2^a$. Where the union 39 is employed, it is not necessary to rotate the barrel $1^a$. This prevents cutting the gasket 31 against the rim of the valve stem $2^a$ as would occur in screwing on the barrel $1^a$. With this construction the barrel 1 does not revolve while the union 39 firmly draws the barrel $1^a$ downward and forms a tight fit between the gasket 31 and upper rim of the valve stem $2^a$.

The diaphragm $19^b$ is formed of spring metal and is adapted to occupy either of the two positions shown. If moved either side of the center, the diaphragm will furnish its own elasticity to snap into its extreme position. The button $5^a$ bears directly against the diaphragm and the nut 40 screwed on the button acts to adjust the pressure of the spring $26^b$ and also serves as a guide for the lower end of the button. $18^b$ designates a disk provided with the valve depressor 21<sup>b</sup>, the disk 18<sup>b</sup> serving to hold the diaphragm 19<sup>b</sup> against a shoulder formed in the barrel 1<sup>b</sup>. In this form of the invention the button indicates maximum pressure in the tire when the button is extended and upon a reduction of pressure of the tire, the spring 26<sup>b</sup> moves down the button 5<sup>a</sup>, but the latter is not permitted to move down gradually but is snapped down owing to the action of the diaphragm 19<sup>b</sup>. Thus when the button is depressed it indicates that the tire needs inflating.

What I claim is:—

1. A tire signal comprising a button having only two stationary positions, means for guiding the button, means responsive to the air pressure in the tire for holding the button in one position when the pressure is at any force above a definite point, and for moving the button to its other position when the pressure falls to any force below said definite point.

2. A tire signal comprising a casing adapted to be secured to the tire, an indicating button mounted on said casing to move through a definite range between two extreme positions, and means constantly preventing escape of air from the casing and controlled by the pressure in the tire for holding the button at one extreme position while the pressure in the tire is above a definite point and for moving the button to the other extreme position when the pressure falls to such definite point.

3. A tire signal comprising an indicating button, guiding means for the button, means controlled by the pressure in the tire for holding the button flush with the guiding means while the pressure is above a definite point and for causing the button to move out and protrude from the guiding means when the pressure falls below the definite point.

4. A tire signal comprising an indicating button having two indicating positions, guiding means for the button, means for moving the button from one position to the other, and means controlled by the air pressure in the tire for detachably locking the button in one of its indicating positions.

5. A tire signal comprising a body adapted to be connected with the tire, a signal slidable in the body, a spring for moving the signal in one direction, and pneumatically controlled means in the body for detachably locking said signal in one position under the spring tension and operating upon a reduction of pressure in the body to release the signal and permit the spring to move the signal to the other position.

6. A tire signal comprising a body adapted to be connected with the tire, a diaphragm in the body, a spring on one side of the diaphragm, the other side of the diaphragm being exposed to the air pressure in the tire, a signal slidable in the body and operated by the spring, and means operated by the diaphragm for locking the signal when the diaphragm is distended.

7. A tire signal comprising a button having two positions, means for guiding the button, means responsive to the air pressure in the tire for holding the button in one position when the pressure is above a definite point, and for moving the button suddenly to its other position when the pressure falls below such point.

8. A tire signal comprising a barrel, a button slidable therein and formed with spring fingers, means within the barrel forming a shoulder, a diaphragm in the barrel exposed on one side to the pressure in the tire, a cone on the other side of the diaphragm adapted to spread the fingers of the button into engagement with said shoulder, and a spring between the button and said cone.

9. A tire signal comprising a barrel, a hollow button slidable therein and formed with spring fingers having shoulders, a button holder comprising a cylindrical member slitted to form spring fingers within the barrel, a diaphragm in the barrel exposed on one side to the air pressure in the tire, a cone resting against the other side of the diaphragm and adapted to spread the shouldered ends of the button fingers into engagement with the lower ends of the spring fingers of said button holder, and a spring within said button and bearing against the cone.

10. A tire signal comprising a barrel, a button slidable in the barrel into either of two positions, said barrel being adapted to be placed in communication with the air pressure in the tire, a diaphragm in said barrel, one side of which receives said air pressure, and means on the other side of said diaphragm and responsive to the movements thereof for holding the button in one position when the pressure is above a definite point and for moving the button suddenly to its other position when the pressure falls below such point, said barrel having a lateral orifice which communicates with the interior of the barrel, and a valve in said orifice.

11. A tire signal comprising a button having two positions, means for guiding the button, means responsive to the air pressure in the tire for holding the button in one position when the pressure is above a definite point and for moving the button suddenly to its other position when the pressure falls below such point, and means for adjusting the second named means to make the same responsive to various degrees of pressure.

12. A tire signal comprising a barrel, a button slidable therein and formed with spring fingers, means within the barrel forming a shoulder, a diaphragm in the barrel, one side of which receives the air pressure from the tire, a cone on the other side of the diaphragm for spreading the spring fingers to move the same into engagement with said shoulders, a threaded stem on said cone, a nut on said threaded stem, and a spring within the button bearing against said nut.

13. A tire signal comprising a barrel, a button slidable therein and formed with spring fingers, means within the barrel forming a shoulder, a diaphragm in the barrel, one side of which receives the air pressure from the tire, a cone on the other side of the diaphragm for spreading the spring fingers to move the same into engagement with said shoulder, a threaded stem on said cone, a nut on said threaded stem, and a spring within the button bearing against said nut, said cone being provided with pressure indicating marks and said nut being provided with an indicating arrow.

14. A tire signal comprising a barrel, a cap screwed thereon and forming part thereof, a slidable button within said cap and having spring fingers, means within said cap forming a shoulder to engage said spring fingers, a cone within said cap, a spring within said button and bearing against said cone, a diaphragm between said cap and barrel, the upper end of the barrel having a transverse orifice with an air inlet valve therein, and a gasket in the barrel below the inlet valve.

15. A tire signal comprising a barrel, the outer end of which is enlarged, a cap having an enlarged end screwed to the enlarged end of the barrel, a diaphragm arranged within said enlarged ends, a slidable button in said cap, means coöperating with the diaphragm and responsive to the movements thereof for holding the button in one position when the diaphragm is distended and for moving the button suddenly to its other position when the diaphragm moves to another position.

16. A tire signal comprising a barrel, the outer end of which is enlarged, a cap having an enlarged end screwed to the enlarged end of the barrel, a diaphragm arranged within said enlarged ends, a slidable button in said cap, means coöperating with the diaphragm and responsive to the movements thereof for holding the button in one position when the diaphragm is distended and for moving the button suddenly to its other position when the diaphragm moves to another position, the enlarged end of the barrel being formed with a lateral orifice and a projecting nipple, and an air inlet valve within said orifice.

17. A tire signal comprising a barrel, the outer end of which is enlarged, a cap having an enlarged end screwed to the enlarged end of the barrel, a diaphragm arranged within said enlarged ends, a slidable button in said cap, means coöperating with the diaphragm and responsive to the movements thereof for holding the button in one position when the diaphragm is distended and for moving the button suddenly to its other position when the diaphragm moves to another position, the enlarged end of the barrel being formed with a lateral orifice and a projecting nipple, an air valve inlet within said orifice, and a rubber gasket molded around the edge of said diaphragm and being clamped between the cap and barrel.

18. A tire signal comprising a barrel, the outer end of which is enlarged, a cap having an enlarged end screwed to the enlarged end of the barrel, a diaphragm arranged within said enlarged ends, a slidable button in said cap, means coöperating with the diaphragm and responsive to the movements thereof for holding the button in one position when the diaphragm is distended and for moving the button suddenly to its other position when the diaphragm moves to another position, and means at the lower end of said barrel for securing the same to the valve stem of the tire.

19. A tire signal comprising a barrel, a button slidable therein and formed with spring fingers, means within the barrel forming a shoulder, a diaphragm in the barrel exposed on one side to the pressure in the tire, a cone on the other side of the diaphragm adapted to spread the fingers of the button into engagement with said shoulder, a spring between the button and said cone, the diaphragm having circumferential corrugations around its rim, and a rubber gasket molded onto said corrugated edges.

In testimony whereof, I have hereunto set my hand at Los Angeles, California, this 9th day of December, 1910.

GEORGE T. HACKLEY.

In presence of—
FRANK L. A. GRAHAM,
P. H. SHELTON.